April 11, 1939.   J. A. BAKER   2,154,082
AUTOMATIC WHEEL CYLINDER ADJUSTMENT DEVICE FOR BRAKES
Filed Nov. 5, 1937
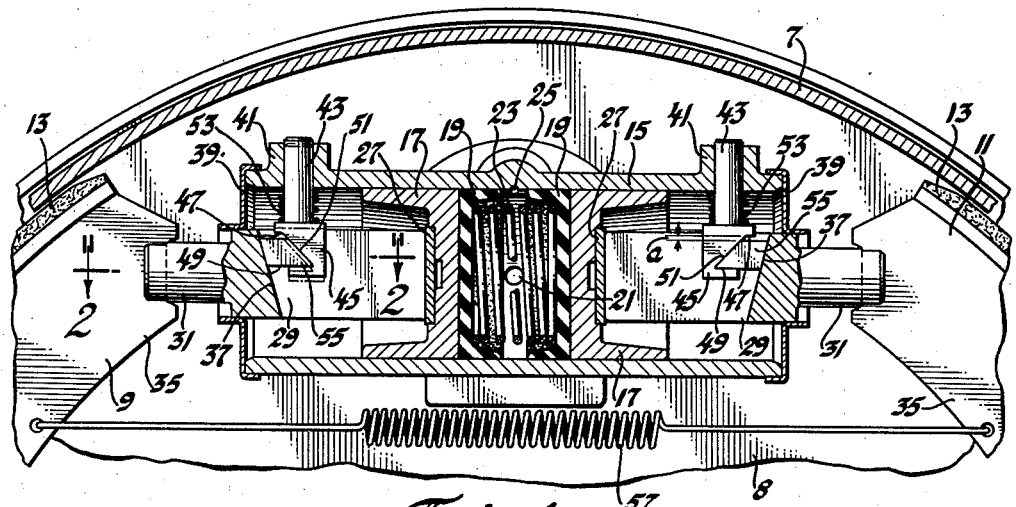
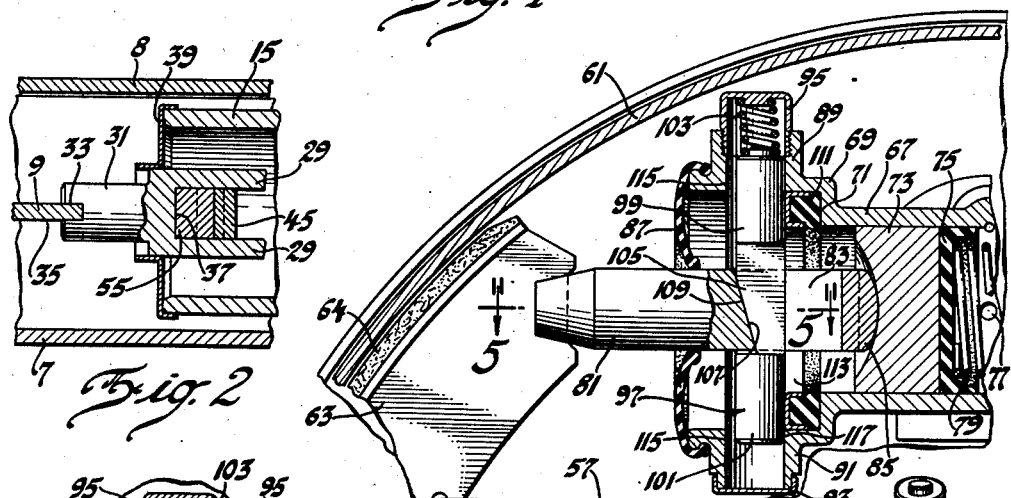
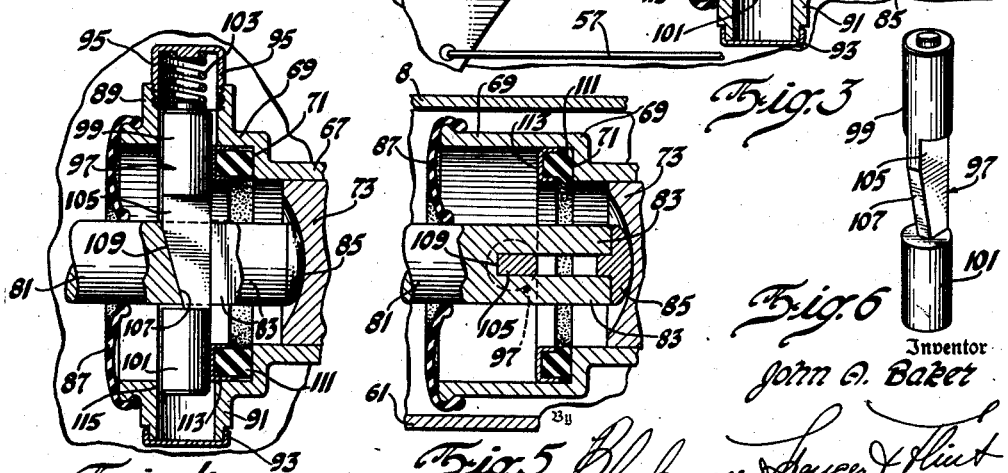
Inventor
John A. Baker Patented Apr. 11, 1939

2,154,082

UNITED STATES PATENT OFFICE 2,154,082

AUTOMATIC WHEEL CYLINDER ADJUSTMENT DEVICE FOR BRAKES

John A. Baker, Dayton, Ohio, assignor to General Motors Corporation, Detroit, Mich., a corporation of Delaware Application November 5, 1937, Serial No. 172,896

12 Claims. (Cl. 188—79.5)

This invention relates to brakes and particularly to brakes for use on vehicle wheels.

More specifically the invention is concerned with a provision for automatic adjustment of the shoes to accommodate for the wear of the friction lining material.

An object of the invention is to provide an improved mechanism of the above kind wherein the parts have a limited free movement under normal condition of shoe and drum clearance and wherein they may be automatically adjusted to maintain that same clearance as the friction lining wears.

Another object is the accomplishment of the major object by mechanism which is effective, simple and inexpensive.

Other objects and advantages will be understood from the following description.

In the drawing:

Figure 1 shows in transverse section through a brake drum, one embodiment of the invention.

Figure 2 is a section on line 2—2 of Figure 1.

Figure 3 is a view like that of Figure 1 but showing a modified form.

Figure 4 is a view like Figure 3 showing the parts displaced from the position they occupy in Figure 3.

Figure 5 is a section on line 5—5 of Figure 3.

Figure 6 is a perspective of one of the parts used in the second embodiment of the invention.

Referring to the drawing, the numeral 7 represents a brake drum, such a drum as is usually carried by and rotates with the wheel of a vehicle. The fixed cover or backing plate is marked 8. The shoes are designated by numerals 9 and 11. To each shoe is secured friction lining 13. The illustrated brake is one wherein the shoes are spread into contact with the drum by hydraulic applying means including a wheel cylinder 15. The wheel cylinder is secured to the cover 8 in any convenient way. Within the cylinder are pistons 17 with sealing members 19, the pistons being intended to be moved away from each other by some suitable hydraulic medium forced between them through an opening 21 by conventional means such as a master cylinder and conduit system, not shown. As is customary a spring 23 is placed between the piston seals to maintain them in contact with the pistons. A normally closed opening 25 is provided to permit escape of air.

Each piston is provided with a steel insert 27 to engage the ends of forks 29 extending from a stem 31, the stem and the forks constituting a push rod. One end of the stem 31 is slotted as shown at 33 to engage the web 35 of the shoe. From Figure 1 it will be seen that there is a steep vertical slope 37 at the other end of the stem adjacent and between the forks 29. A protecting closure 39 of any suitable kind may be used.

Near each end of the cylinder 15 is a boss 41 and through this boss a plunger 43 is mounted for vertical reciprocation. Within the cylinder the plunger 43 has a head 45 notched on its side facing the end of the cylinder. The notch includes an upper short horizontal wall marked 47, a lower relatively long horizontal wall 49 and a connecting sloping surface 51. A spring 53 between the inner wall of the cylinder and the head 45 pushes the plunger downwardly. Numeral 55 is applied to a wedge having opposite faces corresponding to faces 37 and 51, the wedge being located between the furcations 29 and its faces engaging the faces 37 and 51. The upper and lower faces of the wedge are horizontal and parallel and the vertical extent of the wedge between its horizontal faces is somewhat less than the vertical distance between surfaces 47 and 49. This difference is marked $a$ on the drawing. A shoe retracting spring 57 is attached at its ends to the two shoes.

The above described arrangement differs from the conventional by the introduction of the modified push rod 31 and the associated plunger and wedge device. This device in no way modifies the operation of the wheel cylinder in applying the brakes provided the lining thickness remains unchanged. The difference $a$ referred to above may be made substantially the same as or somewhat greater than the normal desired clearance between the drum and the shoe in the released position of the latter. Figure 1 represents the parts in the position they occupy when the brakes are released, the clearance $a$ being at the top of the wedge. The retracting spring 57 is stronger than the plunger spring 53. As the fluid under pressure enters the space between the pistons they separate and their movement of separation functions through the push rod to overcome spring 57 and to take up the clearance between the shoes and the drum. As the push rod reciprocates and as the tension of spring 57 is overcome, spring 53 pushes the plunger 43 downwardly, wedge 55 moving horizontally and a space, having $a$ as its maximum, developing between the lower wall 49 and the lower face of the wedge. If, however, the lining 13 has become worn by previous brake applications so that a shoe clearance exists greater than the predetermined clearance $a$, the push rod moves further and the assembly comprising the plunger and wedge, now in contact at 47, moves downwardly, the wedge sliding along the surface 37 to an extent determined by the excess shoe clearance over the said distance $a$. When thereafter the pressure of the hydraulic medium is released and the spring 57 restores the parts to the brake release position, the wedge 55 moves horizontally only and in doing so it pushes plunger 43 upwardly until the clearance $a$ is again present at 47. This constitutes the new release position. There is therefore a new position of shoe release determined by a new position of the wedge on slope 37, a position wherein the shoe and drum clearance is again reduced to the desired extent.

In Figures 3 to 6 inclusive, there is shown another embodiment of the invention. In this second form the drum is marked 61. One of the shoes is shown at 63, the shoe having a lining 64 subject to wear as before. The wheel cylinder is designated as at 67. In this form of the invention the cylinder has radially enlarged ends 69 forming shoulders 71. The piston 73, its packing 75, the opening for hydraulic medium 77 and the inner spring 79 for holding the packing against the piston need only be mentioned to be understood. The push rod 81 engages the shoe as before and is bifurcated to form forks 83. The forked end of the push rod carries a hardened insert 85 engaging a recess in the piston. A dust guard is shown at 87 engaging the push rod and the end portion of the enlarged cylinder end. Aligned diametrically opposite apertured bosses 89 and 91 are provided which bosses extend from the enlarged ends 69. Boss 91 is closed by a cap 93 and boss 89 by an elongated cap 95. A plunger 97 has its end portions 99 and 101 of cylindrical outline and of less diameter than the diameter of the apertures of the bosses of the cylinder within which they are located. A spring 103 in abutment with cup 95 engages the top of the end portion 99. Between the end portions 99 and 101 is a connecting stem of rectangular outline marked 105, this stem having a wedge surface 107 corresponding to the sloping surface 109 of the push rod between its bifurcated ends. A suitable spring device in the form of an annular rubber ring 111 in the embodiment shown engages the shoulder 71 and, by means of a metallic clip 113 U-shape in section engages the plunger ends at diametrically opposite points. This spring 111 tends to position the plunger toward the outer region 115 of the apertures in the bosses but the shoe retracting spring 57 operating through the push rod and the faces 109 and 107 normally overcomes the resiliency of spring 111 and pushes the plunger into contact with the aperture walls at 117 as shown in Figure 3. When the piston reciprocates to apply the brake by axial movements of push rods 81, the plunger 97 is moved bodily by the spring 111 to the left from the position shown in Figure 3 and toward or in contact with the surface at 115, as may be seen by reference to Figure 4. If the normal lining clearance prevails, this action will occur with no vertical reciprocation of the plunger. If, however, the lining is worn so that the shoe clearance is excessive the push rod continues to advance to such an extent that the spring 111 reaches its fully expanded condition and is unable to move plunger 97 further. Under these circumstances spring 103 pushes plunger 97 downwardly, the surface 107 sliding along the surface 109 until the brake is fully applied. When the brake is released, the plunger 97 retains this new downward position inasmuch as the angle of surface 109 is such that there is no effective component acting vertically, capable of overcoming spring 103. There is thus provided a new retracted position for the operating means with the plunger again in contact at 117 with substantially the same shoe clearance as before.

I claim:

1. In a brake, a drum, a shoe, yielding shoe retracting means, applying means, a push rod with a sloping surface, said push rod being between and in contact with said shoe and said applying means, wedge means having a sloping surface in contact with the said sloping surface of said push rod, a spring operable to move said wedge means along said surface to effect a changed release position for said shoe, and stop means to limit the movement of the wedge means in the direction of movement of the push rod.

2. The invention defined by claim 1, the end of the push rod engaging the applying means being forked and said sloping surface being between said forks.

3. The invention defined by claim 1, together with a mechanism to provide a limited joint movement of said push rod and wedge means in the direction of the shoe applying movement of the push rod prior to the movement of the wedge means by the spring.

4. The invention defined by claim 1, together with a second spring operable to produce a limited joint movement of said push rod and wedge means in the direction of the shoe applying movement of the push rod prior to the movement of the wedge means by the first mentioned spring.

5. The invention defined by claim 1, together with a plunger adapted to be moved by said spring, said plunger and wedge means having cooperating sloping surfaces, their angular direction being such that a component of the force of said yielding means may overcome said spring, said stop means being carried by said plunger.

6. In a brake, a movable shoe, yieldable retracting means for said shoe, movable applying means, motion transmitting means between said applying means and said shoe, a plunger, a spring to move said plunger across the path of movement of said transmitting means, mechanism cooperating with said plunger and transmitting means to predetermine automatically the retracting position of said shoe under the influence of said yielding means.

7. The invention defined by claim 6, said yielding means operable to overcome said spring means in restoring said shoe to brake released position.

8. The invention defined by claim 6, said transmitting means having its end adjacent said applying means formed with parallel walls and having a sloping surface between said walls and said mechanism having an angular face engaging said sloping surface.

9. The invention defined by claim 6, said mechanism including a part formed integrally with said plunger and other spring means to move said plunger to a limited extent jointly with and in the direction of the movement of said transmitting means.

10. In a brake, a drum, a shoe to engage the drum, a reciprocable shoe applying means, motion transmitting means between said applying means and shoe, a plunger reciprocable across the path of movement of said motion transmitting means, said plunger and transmitting means having contacting surfaces defining a plane angularly related to the paths of movement of both said plunger and said motion transmitting means and adapted to effect changes in the released position of the shoes, yielding shoe retracting means, first spring means to reciprocate said plunger and second spring means adapted to move said plunger to a limited extent in the direction of movement of said motion transmitting means.

11. The invention defined by claim 10, the yielding shoe retracting means being operable to overcome said second spring, said contacting surface being such that the yielding means may not overcome the first spring means.

12. In a brake, a drum, a shoe to engage the drum, shoe applying means, motion transmitting means between said applying means and shoe, a plunger reciprocable across the path of movement of said motion transmitting means, a wedge between said plunger and the motion transmitting means and having angular surfaces in contact with both, said plunger having a head shaped to engage and limit the movements of said wedge relative to and in a direction parallel to the axis of the plunger, spring means to reciprocate said plunger and yielding means operable to retract said shoe and reciprocate the motion transmitting means, the angularity of the surface contact between the wedge and the plunger being such that the yielding means reciprocates the plunger against its spring means, the extent of movement being limited by the engagement between the wedge and the plunger head.

JOHN A. BAKER.